(12) United States Patent
Czajkowski

(10) Patent No.: US 8,049,348 B2
(45) Date of Patent: Nov. 1, 2011

(54) DEVICE FOR CONTROLLING AN ELECTRICITY GENERATOR SET

(75) Inventor: Francois Czajkowski, Linars (FR)

(73) Assignee: Moteurs Leroy-Somer, Angouleme (FR)

( * ) Notice: Subject to any disclaimer, the term of this patent is extended or adjusted under 35 U.S.C. 154(b) by 727 days.

(21) Appl. No.: 12/083,620

(22) PCT Filed: Oct. 19, 2006

(86) PCT No.: PCT/FR2006/051069
§ 371 (c)(1),
(2), (4) Date: Jun. 30, 2008

(87) PCT Pub. No.: WO2007/045801
PCT Pub. Date: Apr. 26, 2007

(65) Prior Publication Data
US 2009/0134845 A1 May 28, 2009

(30) Foreign Application Priority Data
Oct. 20, 2005 (FR) ........................ 05 53191

(51) Int. Cl.
*H02P 9/04* (2006.01)
(52) U.S. Cl. ..................... 290/40 A; 290/40 R
(58) Field of Classification Search ............... 290/40 R, 290/40 C, 40 B; 322/37, 24
See application file for complete search history.

(56) References Cited

U.S. PATENT DOCUMENTS

| | | | |
|---|---|---|---|
| 5,321,308 A | 6/1994 | Johncock | |
| 5,504,417 A * | 4/1996 | Kern et al. | 322/32 |
| 5,703,410 A | 12/1997 | Maekawa | |
| 6,414,400 B1 * | 7/2002 | Scott et al. | 290/40 C |
| 6,486,639 B1 | 11/2002 | Montret et al. | |
| 6,624,528 B2 * | 9/2003 | Shimizu et al. | 290/40 C |
| 6,894,401 B2 * | 5/2005 | Beeson et al. | 290/1 A |
| 7,230,345 B2 * | 6/2007 | Winnie et al. | 290/40 D |
| 7,675,187 B2 * | 3/2010 | Woods et al. | 290/1 A |
| 7,812,468 B2 * | 10/2010 | Kuroda et al. | 290/40 C |
| 7,858,904 B2 * | 12/2010 | Fosbinder | 219/133 |
| 2002/0198648 A1 | 12/2002 | Gilbreth et al. | |

FOREIGN PATENT DOCUMENTS

| | | |
|---|---|---|
| EP | 0 233 425 A1 | 8/1987 |
| WO | WO 2004/053295 A1 | 6/2004 |
| WO | WO 2005/034329 A2 | 4/2005 |

* cited by examiner

*Primary Examiner* — Nicholas Ponomarenko
(74) *Attorney, Agent, or Firm* — Oliff & Berridge, PLC

(57) ABSTRACT

The present invention relates to a control device (1) for an electricity generator set, the generator set comprising:

an engine fitted with at least one actuator (2) for controlling fuel admission;

an alternator driven by the engine; and a speed regulator (4) for the engine and controlling the actuator(s);

the control device being arranged to detect a variation in the load on the alternator as a function of at least one voltage thereof and to control the actuator(s) in such a manner as to compensate for the load variation thus detected;

the control device delivering a control signal that acts directly on the actuator(s) taking the place of or being superposed on an output signal of the speed regulator when a variation in load is detected; or the control device delivering a control signal that acts on the actuator(s) via at least a portion of the speed regulator by taking the place of a speed regulator signal.

16 Claims, 4 Drawing Sheets

DEVICE FOR CONTROLLING AN ELECTRICITY GENERATOR SET

The present invention relates to the field of regulating an electricity generator set that includes a heat engine.

The invention applies to regulating heat engines fitted with at least one electric actuator for controlling the speed of the engine, e.g. its injection of fuel.

Known electricity generator sets associate a heat engine with an alternator, each of which has its own regulator device, the engine having a speed regulator and the alternator having a voltage regulator.

Those two regulators are independent of each other: when the load applied to the alternator varies, each regulator is configured to react separately and independently of the other so that the conflicting influences of variations in voltage and variations in speed give rise to a certain delay in regulation.

Furthermore, stable operation of the regulators also gives rise to a certain delay in the event of a sudden variation in load.

Finally, the electrical time constants of the actuator(s) of the heat engine and of the alternator exciter, and the mechanical time constants also add additional delays.

There thus exists a need to benefit from a device for controlling an electricity generator set that makes it possible to react more quickly to load being applied or removed, and to return more quickly from transient conditions to normal conditions.

An object of the invention is to improve the behavior in transient conditions of an electricity generator set including a heat engine, e.g. in such a manner as to enable the amplitude of speed variations and voltage variations that result from the transient conditions to be diminished.

The present invention achieves this by proposing a control device for an electricity generator set, the generator set comprising:

a heat engine fitted with at least one actuator for controlling fuel admission;
an alternator driven by the heat engine; and
a speed regulator for the heat engine and controlling the actuator(s);
the control device being arranged to detect a variation in the load on the alternator as a function of at least one voltage thereof, e.g. measured across the output terminals of the alternator, and to control the actuator(s) in such a manner as to compensate for the load variation thus detected.

Load variation can give rise to a variation in the speed of the alternator.

The device of the invention can enable the speed and/or the output voltage of the alternator to be stabilized.

The device of the invention makes it possible to use information, e.g. coming from a voltage regulator of the alternator, to act as directly as possible on the engine so as to enable the engine to react more quickly to a load being applied to the alternator or removed therefrom. The device of the invention thus makes it possible to obtain speed response times that are shorter on load being applied or being removed. This can enable the amplitude of speed variation to be reduced both when a load is applied and when a load is removed, thereby increasing the operating capacity of the electricity generator set for a given variation in speed.

A part of the voltage variation under transient conditions is caused by the variation in the speed of rotation of the engine, so it is possible to decrease the voltage variation by reducing the speed variation, for the same load variation.

The load may be connected directly to the terminals of the alternator. By way of example, the device need not have an inverter and/or a rectifier connected to the terminals of the alternator.

The control device may deliver a control signal that acts directly on the actuator(s). The control signal can take the place of or be superposed on an output signal from the speed regulator in the event of load variation being detected.

In a variant, the control device may deliver a control signal that acts on the actuator(s) via at least a portion of the speed regulator. By way of example the control signal may take the place of a speed regulator signal. By way of example the control signal may take the place of an output signal from a regulator circuit of the speed regulator. The regulator circuit may, for example, make use of an action strategy of the proportional-integer-derivative (PID) type, having a plurality of thresholds.

The output signal from the speed regulator circuit is a signal that controls the speed of rotation of the engine, said signal being obtained from the output of the regulator circuit, e.g. of the PID type, that handles the difference between the speed on the engine and a speed setpoint value.

The value of the control signal may be determined as a function of the frequency and the derivative of the frequency of the voltage of the alternator.

The electricity generator set may comprise a voltage regulator for the alternator. The frequency and the derivative of the frequency may be determined in the voltage regulator of the alternator. In a variant, the frequency and the derivative of the frequency may be determined between the voltage regulator of the alternator and the speed regulator of the engine.

Determination may be performed by means of a digital processor unit.

The control signal may for example be a signal of quasi-binary type, serving to cut off (=0) or fully open (=1) the admission of fuel. The transitions (0 . . . 1) or (1 . . . 0) may be performed over a pre-set duration.

The device may be configured to apply to the actuator the voltage from a battery of the electricity generator set that powers the speed regulator.

In a variant, the device may be configured to apply to the actuator a voltage greater than a voltage from a battery of the electricity generator set that powers the speed regulator.

The device may also comprise means for reducing the voltage across the terminals of the actuator.

The engine may have a single actuator, or in a variant a plurality of actuators. The actuator(s) may be one or more electric actuators.

The invention also provides a control device for a speed-and-voltage stabilized electricity generator set delivering AC, the generator set comprising:

a heat engine fitted with at least one actuator for controlling fuel admission;
an alternator driven by the heat engine, powering a load directly connected to the output terminals of the alternator; and
a speed regulator of the heat engine controlling the actuator(s);
the control device being arranged to detect a variation in the load of the alternator as a function of at least one voltage therefrom, and to control the actuator(s) in such a manner as to compensate for the load variation thus detected.

Independently or in combination with the above, the present invention also provides an electricity generator set comprising:

a heat engine fitted with at least one electric actuator for controlling fuel admission;

an alternator driven by the heat engine;

a speed regulator for the heat engine and controlling the actuator(s); and a control device arranged to detect a variation in alternator load as a function of the voltage thereof and to control the actuator(s) in such a manner as to compensate the speed variation thus detected.

The control device may deliver a control signal that acts directly on the actuator(s), taking the place of or being superposed on an output signal from the speed regulator when a load variation is detected, or it may deliver a control signal that acts on the actuator(s) via at least a portion of the speed regulator, taking the place of a speed regulator signal.

The voltage of the alternator may enable its frequency and the derivative of its frequency to be obtained. Load variation may be detected by detecting a variation in the frequency of the voltage.

Independently or in combination with the above, the invention also provides a method of controlling a heat engine of an electricity generator set comprising an alternator driven by the heat engine, which method comprises the steps of:

monitoring the voltage delivered by the alternator;

from the monitored voltage, detecting any variation in load of the alternator; and as a function of the load variation as detected, acting on at least one actuator of the heat engine in such a manner as to modify fuel admission, so as to compensate the speed variation of the electricity generator set.

A control signal may be delivered that acts directly on the actuator(s), taking the place of or being superposed on an output signal from the speed regulator when a load variation is detected, or in a variant it is possible to deliver a control signal that acts on the actuator(s) via at least a portion of the speed regulator, taking the place of a speed regulator signal.

The method can enable the speed of the electricity generator set to be stabilized.

The invention also provides a method of controlling a heat engine of a stabilized-speed electricity generator set comprising an alternator driven by the heat engine and a speed regulator for the heat engine, the method comprising the steps of:

monitoring the voltage delivered at the terminals of the alternator;

from the monitored voltage detecting any variation in alternator load; and as a function of the load variation thus detected, acting on at least one actuator of the heat engine in such a manner as to cause a modification in the fuel admission of the heat engine, seeking to compensate the speed variation of the electricity generator set.

When a sudden increase is detected in the load on the alternator, it is possible to act on the actuator(s) in such a manner as to increase the admission of fuel to the engine. In the event of a sudden removal of load, it is possible to act on the actuator(s) in such a manner as to reduce the admission of fuel to the heat engine.

It is possible to act on the actuator(s) downstream from the speed regulator of the engine. In a variant, it is possible to act on the electric actuator(s) downstream from at least a portion of a regulator circuit of the engine speed regulator.

It is possible to increase the voltage applied to the terminals of the actuator(s) in order to increase the admission of fuel to the engine. It is possible to reduce the current in an induction coil of the or each actuator in order to reduce the admission of fuel to the regulator.

The electricity at the terminals of the alternator may be alternating current, in single phase or polyphase form.

The invention can be better understood on reading the following detailed description of non-limiting embodiments thereof, and on examining the accompanying drawings, in which:

FIG. 1 shows a device 1 for controlling an electricity generator set.

Figure 1:
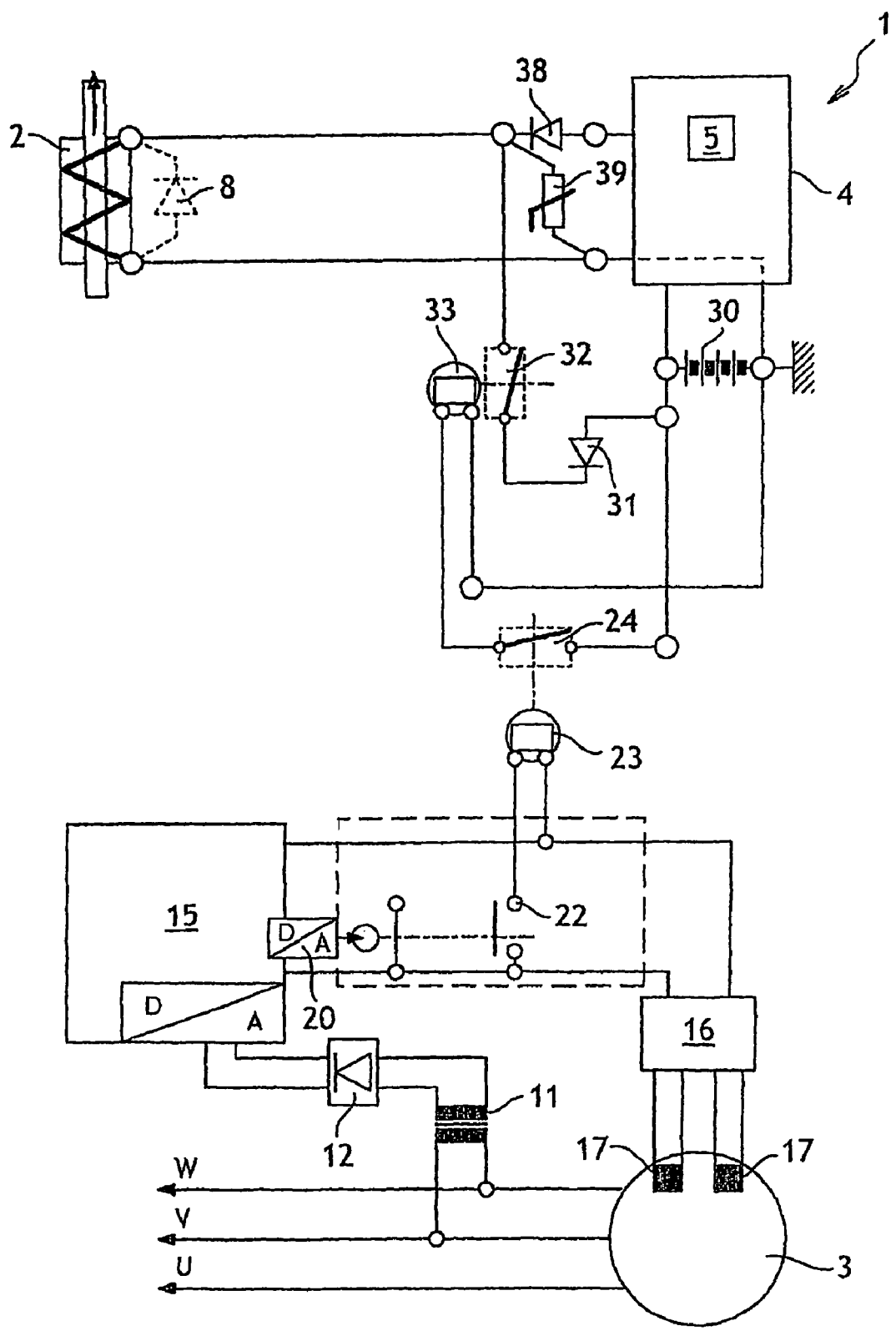
FIG. 1 is a diagrammatic and fragmentary view of a first circuit embodying the invention.

This electricity generator set comprises a heat engine (not shown) fitted with at least one electric actuator 2 for controlling engine speed directly or indirectly, e.g. via a fuel-injection pump. The actuator 2 can control fuel admission, e.g. by controlling injection, or in a variant air admission. By way of example, the actuator may comprise a solenoid valve that is open to a greater or lesser extent as a function of the voltage applied to its terminals. The actuator may also include a freewheel diode 8 enabling voltage surges to be avoided when the electricity power supply circuit is switched on.

The electricity generator set also comprises an alternator 3 driven by the engine.

The speed of the engine is controlled by a speed regulator 4 that acts on the electric actuator(s) 2 and it may include a regulator circuit 5, e.g. of the PID type. The regulator circuit 5 can deliver a speed error signal, i.e. a signal causing fuel to be admitted in the quantity needed by the engine as a function of the difference between the speed measured on the engine and a speed setpoint value. The measured speed makes it possible to deliver a composite signal (e.g. P+I+D).

The control device 1 includes a digital processor unit 15. By way of example, the digital processor unit 15 comprises one or more digital circuits, e.g. one or more microprocessors or microcontrollers.

This digital processor unit 15 is arranged to receive at least one information signal representative of a voltage of the alternator, e.g. the voltage across the terminals of two phases of the alternator, and in the event of one or more voltage parameters varying, it is arranged to act on the regulation of the speed of the engine.

The digital processor unit 15 can act on the electric actuator 2, as explained below.

The alternator 3 delivers three-phase electricity having phases U, V, and W. By way of example, the voltages across the terminals of two of the phases of the alternator are monitored by means of an isolating transformer 11 and a rectifier bridge 12.

By way of example, the voltage at the output from the rectifier bridge is converted into a digital signal by an analog-to-digital converter prior to being processed by the digital processor unit 15.

The processor unit may be powered by a stabilized power supply connected to auxiliary windings 17 of the alternator, there being two of these windings, for example. By way of example the auxiliary windings 17 may also be used for powering the field coil of the exciter of the alternator via a voltage regulator 16, as described in patent application EP-A1-0 233 425.

The digital processor unit 15 may be arranged to read the alternator voltage and determine therefrom the values for the frequency and the derivative of the frequency.

The digital processor unit may be arranged to perform an action strategy, e.g. of the fast Proportional+Derivative type, implementing logic choices relating to the frequency and the derivative of the frequency that are compared with reference levels.

The treatment performed and the choices for those reference levels can serve to eliminate the influence of frequency modulation due to the cyclical irregularity that is inherent to spark-ignition engines.

The digital processor unit 15 may include an output for controlling the opening or closing of a contact 22 in order, optionally to exert an action on the regulation of the engine.

By way of example, this output controls a relay and includes, for example, a digital-to-analog converter 20. In a variant the output does not include a digital-to-analog converter.

Closing the contact 22 acts via a more powerful relay 23 to close a contact 24, which itself closes a contact 32 via a relay 33.

By way of example, the relay 24 is powered by a battery 30 that serves to power the speed regulator 4.

Closing the contact 32 causes a voltage to be applied to the electric actuator 2, which then takes the place of or acts in conjunction with the voltage delivered by the speed regulator 4 that controls fuel injection.

An output diode 38 of the speed regulator 4 enables the voltages to be superposed. The control signal enables a high value to be imposed on the voltage across the terminals of the actuator.

Closure of the contact 22 thus occurs when the digital processor unit 15 detects that a load has been applied to the alternator 3.

Whenever a load is applied to the alternator, the device shown in FIG. 1 serves to apply to the actuator 2, the voltage from the battery 30 of the electricity generator set that powers the speed regulator.

Naturally, it would not go beyond the ambit of the present invention for things to be arranged differently.

Figure 2:
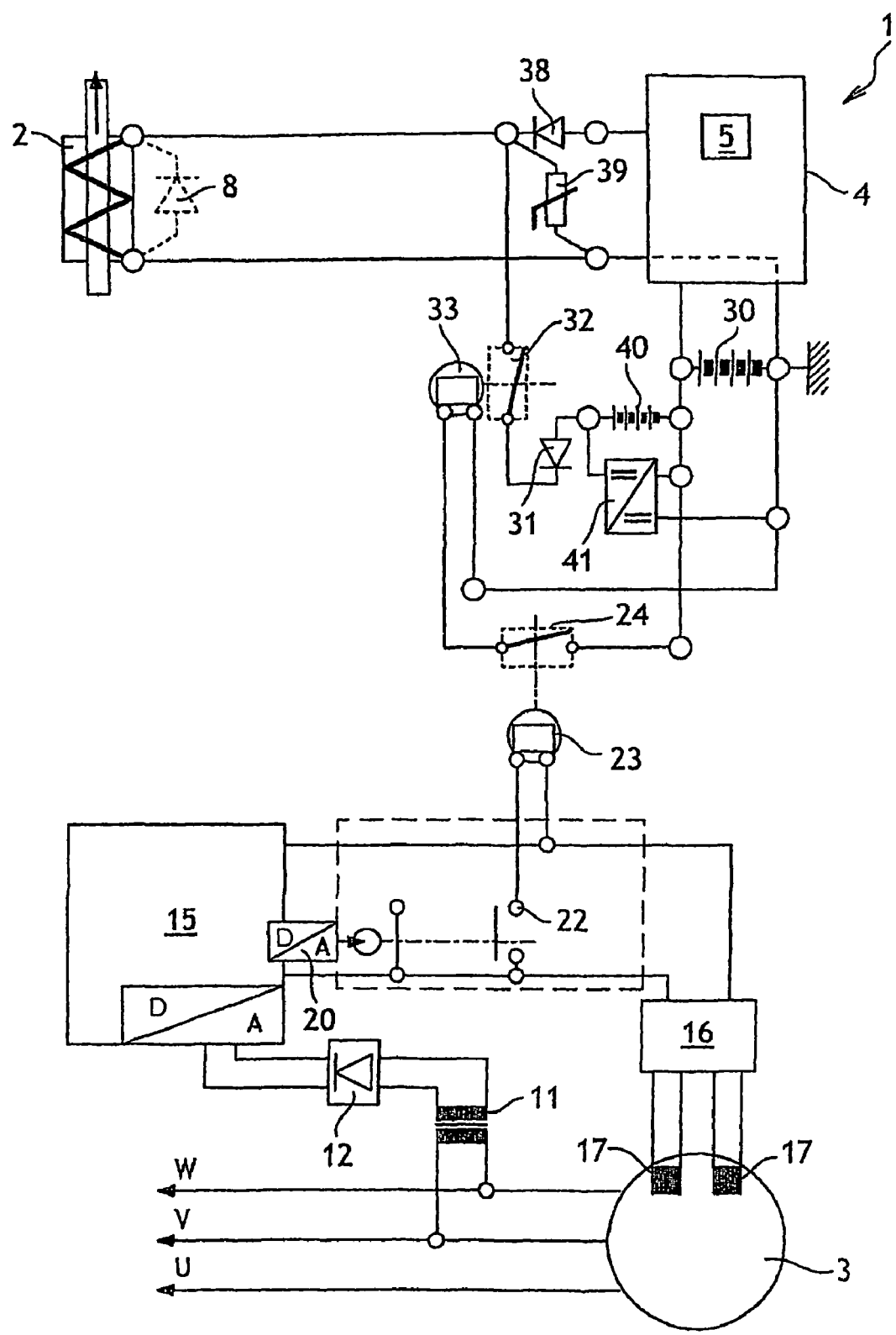
FIGS. 2 to 4 are diagrammatic and fragmentary views of variant embodiments of the invention.

By way of example, FIG. 2 shows an embodiment that differs from the embodiment of FIG. 1 by the fact that a voltage greater than that of the battery 30 is applied to the actuator 2 when the contact 32 is closed, this voltage being obtained from a source of electricity 40 connected in series with the battery 30.

By way of example, the source 40 can be an additional battery or an electrolytic capacitor, and it can be recharged, e.g. by using a DC-DC converter 41.

In the examples of FIGS. 1 and 2, the device responds to the application of a load.

Things could be arranged differently, and in particular the device 1 could respond to load being removed from the alternator or could respond both to the alternator being loaded and to it having load removed therefrom.

Figure 3:
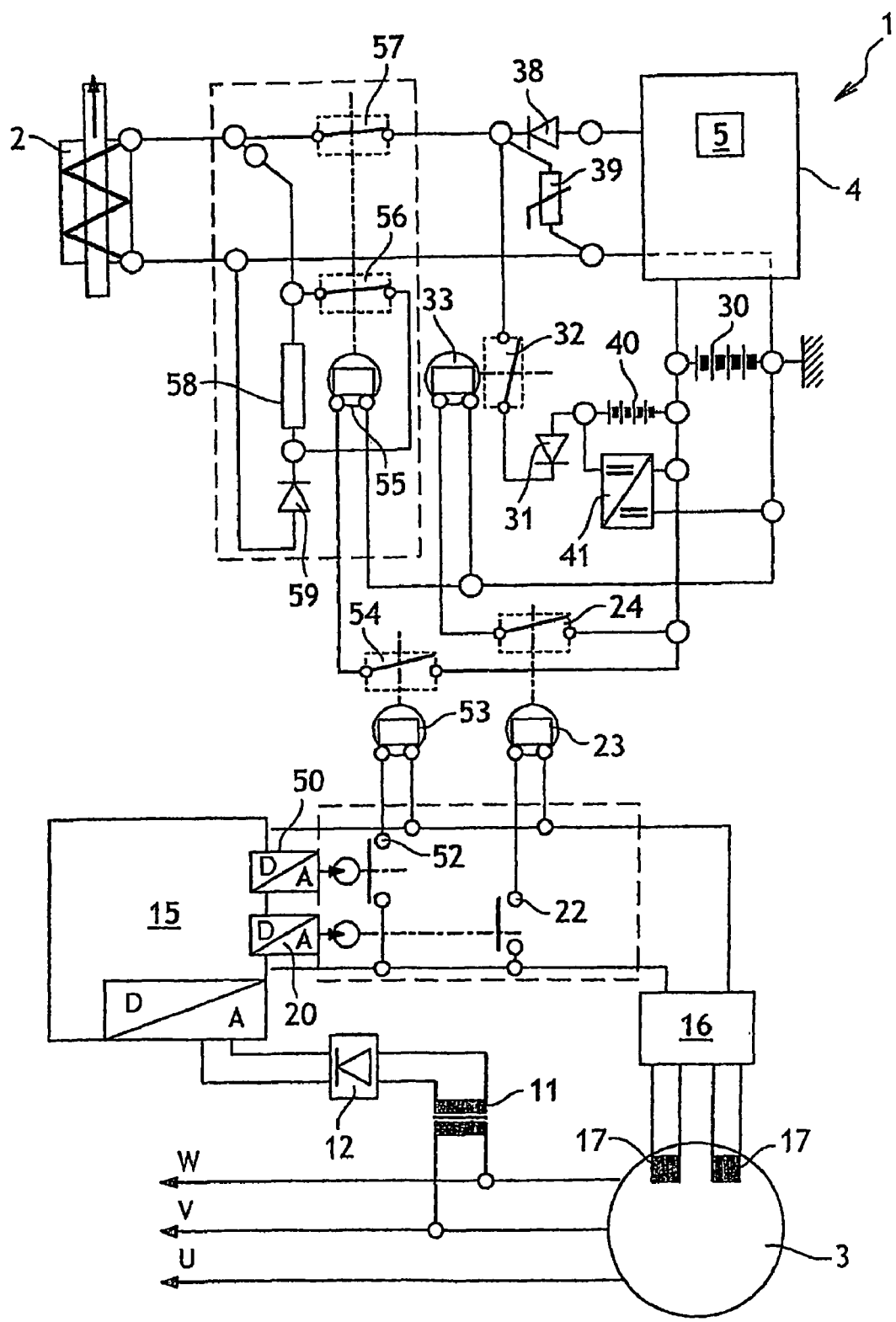

In the example of FIG. 3, the digital processor unit 15 is arranged to deliver a signal 50 on detecting that the alternator is having load removed. By way of example, the signal 50 is an analog signal, the digital processor unit 15 including a digital-to-analog converter enabling the signal 50 to be delivered.

By way of example, the signal 50 causes a switch 52 to close, and in cascade causes a contact 54 to open via a relay 53, and then contacts 56 and 57 to open via a relay 55 actuated by the contact 54 opening.

In this embodiment, the freewheel diode 8 is replaced by a diode 59 connected in series with a discharge resistor 58 and that is short circuited when the device is inactivated by the contact 56 of the relay 55.

Opening the contact 56 enables the current flowing in the induction coil of the actuator to be reduced very quickly by connecting it in parallel with the discharge resistor 58. Reducing the current flowing through the actuator 2 serves to reduce the admission of fuel to the engine.

In a variant that is not shown, the discharge resistor 58 is replaced by a bleeder circuit comprising, for example, a discharge capacitor acting on opening of the contacts 56, 57 to reduce more quickly the initial current powering the electric actuator.

The device of FIG. 3 can be used for processing load disconnections quickly or indeed for interrupting fuel injection in the event of excessive speed. Because the device does not make use of speed and excess speed information from sensors on the engine, it contributes to increasing the reliability and the safety of the electricity generator set.

Figure 4:
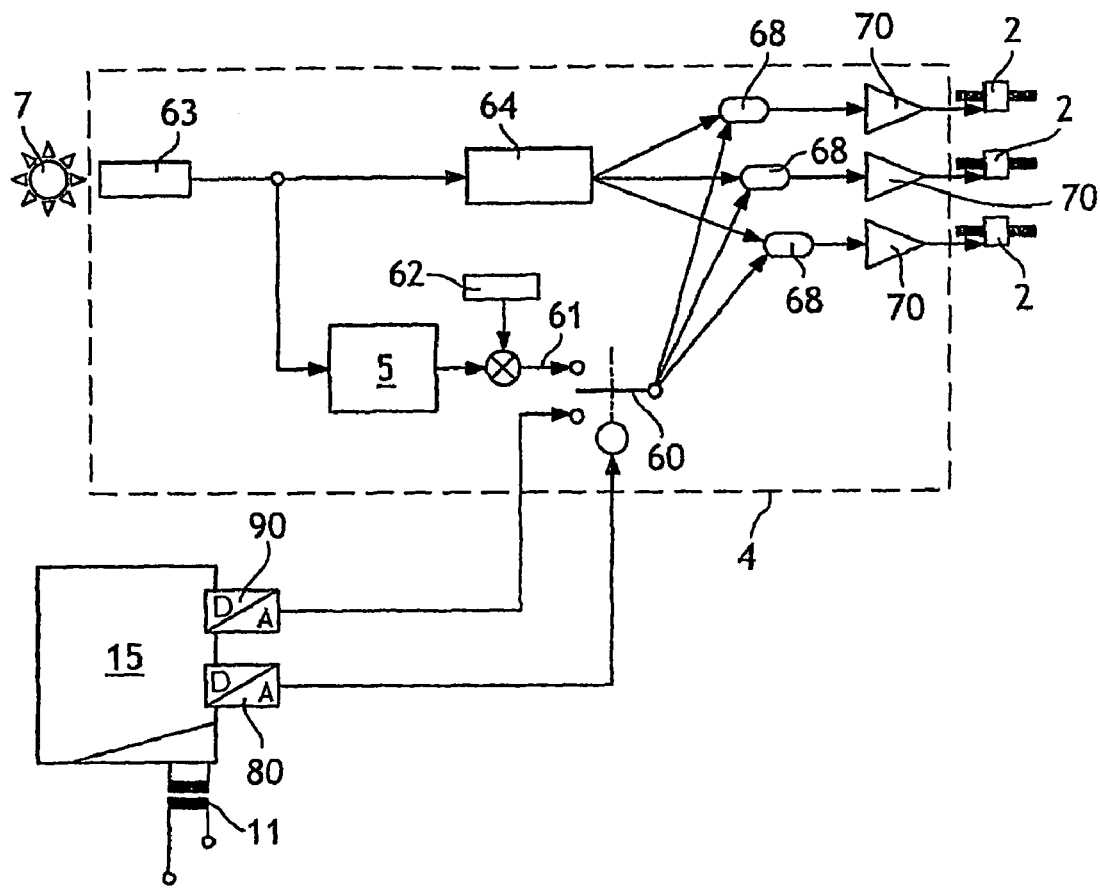

It would not go beyond the ambit of present invention for the engine to include a plurality of electric actuators, e.g. associated with respective cylinders or groups of cylinders, as shown in FIG. 4.

In this example, the speed regulator comprises a control circuit 70 for each actuator.

The shaft speed of the engine 7 can be read by a detector 63, and this information can then be sent to the regulator circuit 5 and to a synchronizer system 64.

Each actuator 2 is controlled as a function of a speed error signal 61 delivered by the regulator circuit 5 as a function of a setpoint speed, e.g. contained in a memory 62.

The digital processor unit 15 can be arranged to act via an output 80 to control a changeover contact 60 that enables the speed error signal 61 to be replaced by a signal coming from an output 90 of the digital processor unit. The digital processor unit 15 can serve to generate the control signal for taking the place in the speed regulator of the speed regulator speed error signal in the event of a load being applied to the alternator, i.e. when the frequency of the alternator voltage wave becomes less than a threshold f1, for example, and when the value of the derivative of the frequency is negative and less than a threshold $-df1/dt$. Conversely, the control signal can be generated in the event of the alternator having load removed, i.e. when the value of the frequency of the voltage wave is greater than a threshold f2 and when the value of the derivative of the frequency is positive and greater than a threshold $+df2/dt$.

The synchronizer system 64 serves to synchronize and set the duration of the actuation of the various actuators 2 as a function of the angular position of the shaft and the speed of rotation of the engine 7 by means of circuits 68 that perform a logic AND function between the synchronization signal and the speed error signal or the control signal.

In the above description, the relay contacts shown could optionally be static components, for example semiconductor electronic switches, e.g. insulated-gate bipolar transistors (IGBTs).

The invention is not limited to a particular engine, and the engine may be powered by any type of liquid or gaseous fuel.

The expression "comprising a" should be understood as being synonymous with "comprising at least one", unless specified to the contrary.

The invention claimed is:

1. A control device for an electricity generator set, the generator set comprising:
   a heat engine fitted with at least one actuator for controlling fuel admission;
   an alternator driven by the heat engine; and
   a speed regulator for the heat engine and controlling the actuator(s);
   the control device being arranged to detect a variation in the load on the alternator as a function of at least one voltage thereof and to control the actuator(s) in such a manner as to compensate for the load variation thus detected;

the control device delivering a control signal that acts directly on the actuator(s) taking the place of or being superposed on an output signal of the speed regulator when a variation in load is detected; or the control device delivering a control signal that acts on the actuator(s) via at least a portion of the speed regulator by taking the place of a speed regulator signal.

2. A device according to claim 1, delivering a control signal that acts on the actuator(s) taking the place of or being superposed on an output signal from the speed regulator when the load variation is detected.

3. A device according to claim 1, delivering a control signal that acts on the actuator(s) via at least a portion of the speed regulator, taking the place of a speed regulator signal.

4. A device according to claim 3, in which the control signal takes the place of an output signal from a regulator circuit of the speed regulator.

5. A device according to claim 4, in which the regulator circuit makes use of a proportional integer derivative (PID) type action strategy having a plurality of thresholds.

6. A device according to claim 1, in which the value of the control signal is determined as a function of the frequency and the derivative of the frequency of the alternator voltage.

7. A device according to claim 6, in which the electricity generator set comprises a voltage regulator for the alternator and in which the frequency and the derivative of the frequency are determined in the voltage regulator of the alternator.

8. A device according to claim 6, in which the electricity generator set comprises a voltage regulator for the alternator, the frequency and the derivative of the frequency being determined between the voltage regulator of the alternator and the speed regulator of the engine.

9. A device according to claim 6, in which the determination is performed by means of a digital processor unit.

10. A device according to claim 1, in which the control signal is a signal of quasi-binary type, enabling fuel admission to be closed or opened.

11. A device according to claim 1, configured to apply to the actuator the voltage of a battery of the electricity generator set and powering the speed regulator.

12. A device according to claim 1, configured to apply to the actuator a voltage greater than a voltage of a battery of the electricity generator set and powering the speed regulator.

13. A device according to claim 1, including means for reducing the voltage across the terminals of the actuator.

14. A device according to claim 1, in which the heat engine has a single actuator.

15. A device according to claim 1, in which the heat engine has a plurality of actuators.

16. A device according to claim 1, in which said at least one actuator is an electric actuator.

* * * * *